(12) United States Patent
Zentgraf (10) Patent No.: US 8,352,066 B2
(45) Date of Patent: Jan. 8, 2013

(54) MACHINE TOOL, OPERATING METHOD FOR A MACHINE TOOL AND OBJECTS ASSOCIATED THEREWITH

(75) Inventor: Eberhard Zentgraf, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 719 days.

(21) Appl. No.: 12/514,669

(22) PCT Filed: Oct. 19, 2007

(86) PCT No.: PCT/EP2007/061185
§ 371 (c)(1),
(2), (4) Date: May 13, 2009

(87) PCT Pub. No.: WO2008/061851
PCT Pub. Date: May 29, 2008

(65) Prior Publication Data
US 2010/0030367 A1    Feb. 4, 2010

(30) Foreign Application Priority Data
Nov. 21, 2006    (DE) .................... 10 2006 054 808

(51) Int. Cl.
*B23Q 15/22* (2006.01)
(52) U.S. Cl. .......... 700/186; 409/131; 409/201; 483/55; 356/615; 144/382; 700/3

(58) Field of Classification Search ................. 700/186, 700/3; 409/131, 201; 483/55; 356/615; 144/382
See application file for complete search history.

(56) References Cited

U.S. PATENT DOCUMENTS

| | | | | |
|---|---|---|---|---|
| 4,288,849 A | * | 9/1981 | Yoshida et al. | 700/3 |
| 2002/0077233 A1 | * | 6/2002 | Oldani | 483/55 |
| 2006/0121828 A1 | * | 6/2006 | Cambridge et al. | 451/5 |

FOREIGN PATENT DOCUMENTS

| | | |
|---|---|---|
| DE | 102005005905 A1 | 8/2006 |
| EP | 0470350 A2 | 2/1992 |
| EP | 1708058 A1 | 10/2006 |
| JP | 11114759 A | 4/1999 |
| WO | WO 03089999 A1 | 10/2003 |

* cited by examiner

Primary Examiner — Tejal Gami (57) ABSTRACT

A machine tool with a main positioning device for positioning a main support element in a translational linear direction within a main region of displacement is provided. A main machining device and an accessory machining device are arranged on the main support element. The machining devices have pivoting devices for pivoting the machining heads in a rotatory basic pivoting direction. Every accessory pivoting device is connected to the main support element via a respective supplementary accessory positioning device for positioning the respective accessory machining head in the translational linear direction relative to the main support element within a respective supplementary accessory region of displacement.

20 Claims, 7 Drawing Sheets

Determine on the basis of the linear positioning PT exclusively of the main machining head, a main positioning PTH: PTH=PT of the main machining head — S2

FIG 8

Determine a linear positioning PT and a pivot positioning PS respectively for each machining head on the basis of an application program — S1

Determine a main positioning PTH for the basic machining head on the basis of the linear positioning PT — S2   S21

On the basis of its linear positioning PT and the main positioning PTH, determine a basic accessory positioning PTG for the basic machining head Determine a supplementary accessory positioning PTZ for each accessory machining head on the basis of its linear positioning PT and the main positioning PTH — S5

Control the main positioning device such that this moves the main support element to the main positioning PTH — S3

Control the basic accessory positioning device such that the basic accessory positioning device moves the basic machining head to the basic accessory positioning PTG Control each supplementary accessory positioning device such that the respective supplementary accessory positioning device moves the accessory machining head able to be positioned by it to the respective supplementary accessory positioning PTZ — S22 / S6 / S4

Control each pivoting device such that this pivots the machining head able to be pivoted by it into its respective pivot positioning PS

MACHINE TOOL, OPERATING METHOD FOR A MACHINE TOOL AND OBJECTS ASSOCIATED THEREWITH

CROSS REFERENCE TO RELATED APPLICATIONS

This application is the US National Stage of International Application No. PCT/EP2007/061185 filed Oct. 19, 2007 and claims the benefit thereof. The International Application claims the benefits of German Patent Application No. 10 2006 054 808.6 DE filed Nov. 21, 2006, both of the applications are incorporated by reference herein in their entirety.

FIELD OF INVENTION

The present invention relates to a machine tool,
with the machine tool having a main positioning device by means of which a main support element is able to be positioned in at least one translational linear direction within a main region of displacement,
with a main machining device and at least one accessory machining device being arranged on the main support element,
with the basic machining device having a basic pivoting device, by means of which a basic machining head is able to be pivoted in at least one rotational basic pivoting direction,
with each accessory machining device having an accessory pivoting direction by means of which in each case an accessory machining head is able to be pivoted in at least one respective rotational accessory pivoting direction.

The word components "basic" and "accessory" as well as "main" and "supplementary" serve in this case—as well as in the remainder of the text of the description and the claims— merely to make a linguistic distinction between the individual components of the machine tool. There is no wider meaning assigned to these terms.

The present invention also relates to an operating method for such a machine tool, with a control device for the machine tool executing the following steps in a cycle:

It determines a translational linear positioning and a rotational pivot positioning on the basis of an application program for each machining head;

it determines a rotational main positioning for the basic machining head on the basis of at least the translational linear positioning;

it controls the main positioning device such that this moves the main support element to the translational main positioning;

it controls each basic pivoting device such that this pivots the machining head able to be pivoted by it into its respective rotational pivot positioning.

The present invention also relates to a computer program comprising machine code, the execution of which is effected by a control device for a machine tool of the type described above such that the control device controls the machine tool in accordance with a method of operation of the type described above.

Finally the present invention relates to a data medium, on which a computer program of the type described above is stored, in which a computer program of the type described above is stored, with the computer program able to be executed by the control device.

BACKGROUND OF INVENTION

Machine tools and the further objects described above are for example known from WO 03/089999 A1. They are offered for example as so-called multiple five-axis milling machines. These types of machine tool feature at least one linear axis, by means of which all machining heads are displaced translationally simultaneously and in the same way. A movement of the machining heads in other translational linear directions can alternately be impossible or be possible independently of each other. A typical embodiment of a prior art machine tool and its method of operation will be explained in greater detail below in conjunction with FIGS. 1 and 2.

Figure 1:
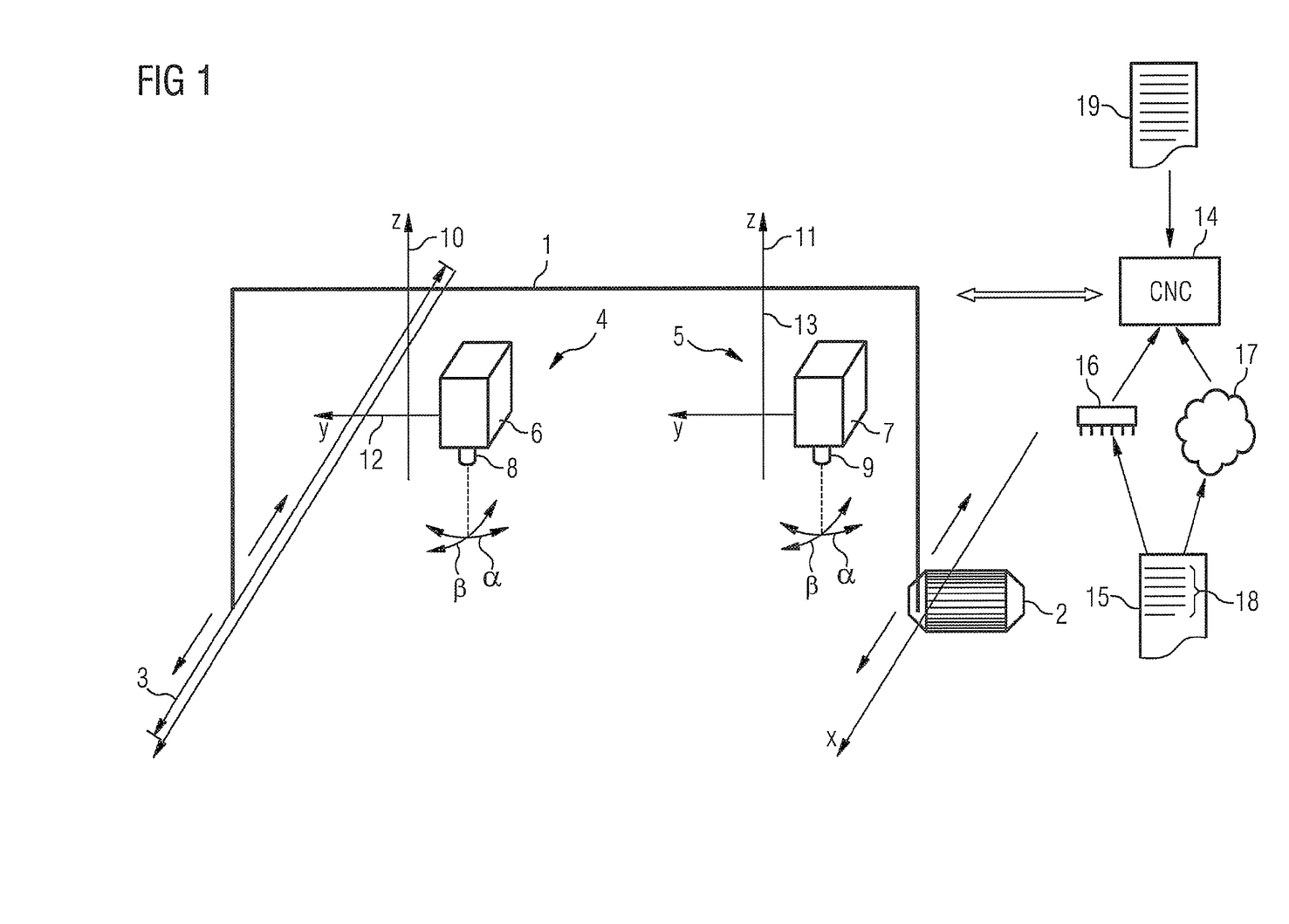
FIG. 1 a prior art machine tool,
FIG. 2 a flowchart,
FIG. 3 a machine tool and
FIG. 4 to 8 flowcharts.

In accordance with FIG. 1 the prior art machine tool has a portal 1. The portal 1 corresponds to a main support element 1 as defined by the present invention. The portal 1 is able to be positioned by means of a schematically shown drive 2 in a translational linear direction—typically referred to below as the x-direction. The drive 2 of the portal 1 corresponds to a main positioning device 2 as defined in the present invention.

The portal 1 is able to be displaced by means of the drive 2 over a region of displacement 3. The region of displacement 3 of the portal 1 corresponds to a main region of displacement 3 as defined in the present invention. It can amount to several meters.

Arranged on the portal 1 are (at least) two machining devices 4, 5. They correspond to a basic machining device 4 and an accessory machining device 5 as defined in the present invention. For the prior art machine tool the machining devices 4, 5 are embodied identically.

Each machining device 4, 5 has a basic pivot device 6, 7, by means of which a respective machining head 8, 9 is able to be pivoted in at least one rotational pivoting direction α, β. Mostly the machining heads 8, 9 are able to be pivoted in two rotational pivoting directions α, β.

It is possible in individual cases for the machining heads 8, 9 only to be able to be pivoted relative to the portal 1. As a rule however the machining devices 4, 5 however have further positioning devices 10 to 13 by means of which the machining heads 8, 9 are able to be translationally positioned in at least one further direction, with this further direction able to be positioned linearly independently—especially orthogonally—to the direction in which the portal 1 is able to be translationally positioned. Often the machining heads 8, 9 are even able to be translationally positioned in two further directions—typically referred to below as the y-direction and z-direction. Provided the machining heads 8, 9 are able to be translationally positioned relative to the main support element 1, these translational positionings only act on the respective machining head 8, 9.

Mostly the translational degrees of freedom in which the main support element 1 is able to be moved, and the translational degrees of freedom in which the machining heads 8, 9 are able to be moved independently of each other relative to the main support element 1 supplement each other to form right-angled Cartesian coordinate systems, which—depending on the position of the individual case—cover one plane or the three-dimensional space.

The above embodiment is typical of prior art multiple machine tools. However further deviations are readily possible and conceivable. Thus for example, in an alternate embodiment the main support element might not be embodied as portal 1, but for example as a support which is able to be translationally positioned along of the portal 1. In this case the main support element would be able to be translationally positioned in two directions orthogonal to each other, so that a translational positioning of the machining heads 8, 9 independently of each other relative to the main support element is either not possible or only in a single direction linearly independent of the possible translational directions of movement of the main support element. In exceptional cases it can even be possible that in all three translational directions, as a result of the design, only a common positioning of the machining heads 8, 9 is possible. This can for example be the case if the main support element is embodied as a bar able to be lowered and raised on the above-mentioned support.

The machine tool of FIG. 1 is controlled by a control device 14. The control device 14 is embodied as a rule as a motion control unit, especially as a numerical control (=CNC). A computer program 15 (system program 15) is thus stored in the control device 14. The computer program 15 has been created beforehand and fed to the control device 14. For example the computer program 15 can have been stored on a data medium 16 and fed in this way to the control device 14. The data medium 16 can in this case be embodied in any way, for example as a memory card, a USB memory stick, as a CD-ROM etc.

Alternatively to being supplied via a data medium 16 it is possible to convey the computer program 15 to the control device 14 via a computer-computer-connection 17. The computer-to-computer connection 17 can be the Internet for example.

The computer program 15 comprises machine code 18 which is able to be executed by the control device 14. The execution of the computer program 15 by the control device 14 has the effect of the control device 14 controlling the machine tool in accordance with an operating method which is explained in greater detail below in conjunction with FIG. 2.

Figure 2:
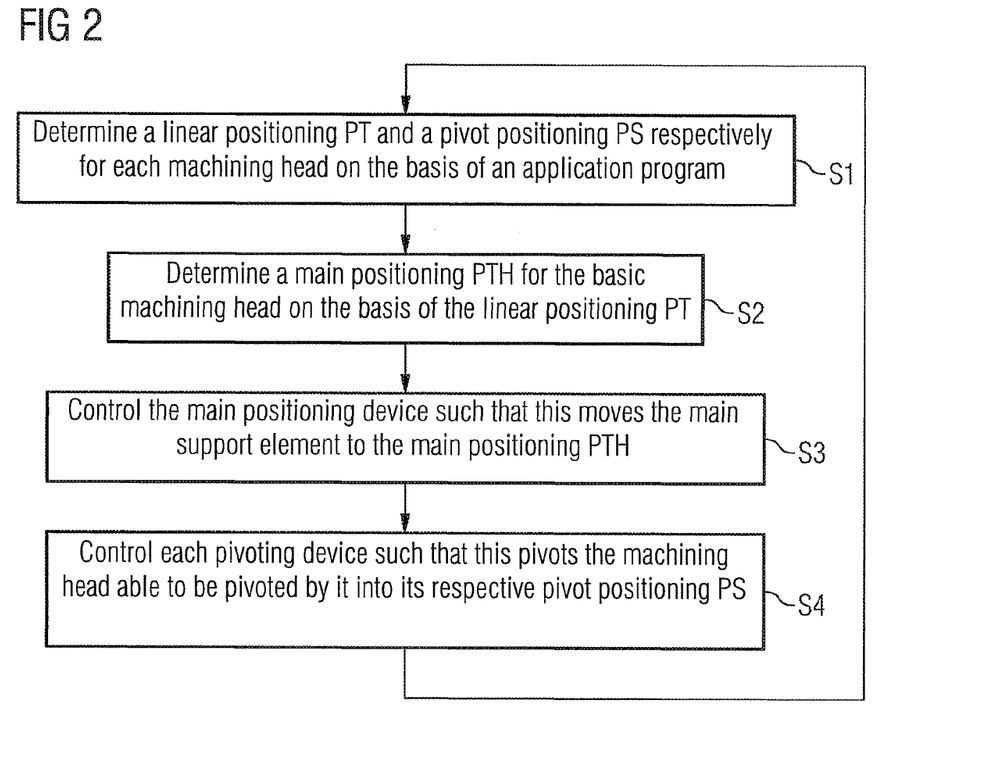

In accordance with FIG. 2 the control device 14 initially determines in a step S1 for each machining head 8, 9 one translational linear positioning PT (T for translational) and a rotational pivot positioning PS (S for pivoting) on the basis of an application program 19. The application program 19 can for example be a subprogram in accordance with DIN 66025.

In a step S2 the control device 14 then determines on the basis of the translational linear positioning PT a translational main positioning PTH for the basic machining head 8. In a step S3 the control device 14 controls the main positioning device 2 such that the latter moves the main support element 1 to the translational main positioning PTH. Furthermore the control device 14 in a step S4 controls each basic pivoting device 6, 7 such that the latter pivots the machining head 8, 9 able to be pivoted by it into its respective rotational pivoting positioning PS.

In the example of FIG. 1, in which the main support element 1 is only able to be translationally positioned in one dimension, the control device 14 also determines—preferably within the framework of step S2—a positioning for the other translational directions, in which the machining heads 8, 9 are able to be positioned independently of each other. These positioning movements are of subordinate importance however within the framework of the present invention. They will also be determined and executed within the framework of the present invention, which will be dealt with later, on the same way as is the case in the prior art. These translational positioning processes are thus not dealt with in any greater detail below.

Because of the fact that the machining heads 8, 9 are only able to be jointly positioned in at least one translational direction, the application program 19 and the computer program 15 must interoperate with each other such that the machining heads 9 are always positioned in the same way. The translational linear positionings PT and the rotational pivot positionings PS of the basic machining head 8 are thus simply accepted as corresponding positionings of the accessory machining head 9.

The method of operation of the prior art described above leads to satisfactory results if the machining heads 8, 9 are constructed identically and also tools which are carried by the machining heads 8, 9 are identically constructed. The identical nature of machining heads 8, 9 and tools can however not always be guaranteed. Furthermore the above-mentioned methodology is necessarily restricted to executing identical machining processes.

SUMMARY OF INVENTION

An object of the present invention is to create options by means of which the possibilities for use of multiple machine tools are greatly expanded, the advantages of multiple machine tools are not adversely affected however.

The object is achieved for a machine tool of the type described above by each accessory pivot device with the main support element being connected via a respective supplementary accessory position device, by means of which the respective accessory machining head is able to be positioned in the at least one translational linear direction relative to the main support element within a respective supplementary accessory region of displacement.

This is because each accessory machining head is independent of the basic machining head (and in the case a number of accessory machining heads, is also independent of the other accessory machining heads) in the at least one translational linear direction. The translational positionability achieved by the respective supplementary accessory positioning device is actually restricted to the respective supplementary accessory region of displacement. However this restriction is not critical as a rule since the supplementary accessory positioning device must only execute small translational balancing and correction movements.

The object is also achieved for the operating method, by the control device in addition to the steps described above in connection with FIG. 2 for each accessory machining head on the basis of its translational linear positioning and the translational main positioning, determining a respective translational supplementary accessory positioning and controlling each supplementary accessory positioning device such that this then moves the accessory machining head able to be positioned by it to the respective translational supplementary accessory positioning.

The object is also achieved by a computer program comprising a machine code which when executed by a control device for a machine tool causes the control device to control the machine tool in accordance with the method of operation.

Finally the object is achieved by a data medium on which the computer program is stored and by a control device for a machine tool, in which the computer program is stored which is able to be executed by the control device.

As regards the embodiment of the machine tool, it is sufficient for only the accessory machining heads to be able to be positioned in the at least one translational linear direction relative to the main support element. It is however possible as an alternative for the basic pivoting device to be connected to the main support element via a basic accessory positioning device by means of which the basic machining head is able to be moved in the at least one translational linear direction relative to the main support element within a basic accessory region of displacement. In this case all machining heads—i.e. both the accessory machining heads and also the basic machining head—are able to be positioned translationally by means of the respective corresponding accessory positioning device relative to the main support element.

The last-mentioned methodology especially makes sense if the basic accessory positioning device and the supplementary accessory positioning device have a dynamic which is greater than—especially significantly greater than—the dynamic of the main positioning device. This is because the machine tool can mostly be operated with a higher dynamic in such cases.

For the operating method it is of advantage for the control device for each machining head to determine its respective translational linear positioning by determining on the basis of the application program, while ignoring the respective rotational pivoting positioning, a respective preliminary translational linear positioning, to determine, on the basis of the respective rotational pivot positioning and specific geometry data for the respective machining head, respective translational linear position correction data and to determine the respective translational linear positioning on the basis of the respective temporary translational linear positioning and the respective translational linear position correction data.

In many cases this methodology allows the determination of the respective translational linear positioning to be simplified.

If the machining processes to be executed by the machining heads correspond to each other, the determination of the preliminary translational linear positionings and of the rotational pivot positionings can be simplified by the control device determining, for each accessory machining head its translational linear positioning and its rotational pivot positioning by determining the preliminary translational linear positioning and the rotational pivot positioning for the basic machining head and accepting it as temporary translational linear positioning and rotational pivot positioning for the respective accessory machining head.

Alternatively it is possible for the control device to determine the preliminary translational linear positioning and the rotational pivot positioning for each machining head independent of the preliminary translational linear positioning and the rotational pivot positioning of the other machining heads. This last-mentioned methodology can always be executed even regardless of whether the preliminary translational linear positionings of the machining heads correspond to each other or not.

The translational linear positionings must—at least in the at least one translational linear direction—be determined for each machining head regardless of the translational linear positionings of the other machining heads. As a result of the embodiment it is however additionally possible to also determine the rotational pivot positionings of the machining heads independently of each other.

It is also possible for the control device to take over the translational linear positioning for the basic machining head as translational main positioning. In the event of the basic pivoting device with the main support element being connected via the basic accessory positioning device, it is however alternatively possible for the control device to determine the translational main positioning on the basis of the preliminary translational linear positioning of all machining heads, for the basic machining head, to determine a translational basic accessory positioning on the basis of its translational linear positioning and the translational main positioning and to control the basic accessory positioning device such that this moves the basic machining head to the translational basic accessory positioning.

BRIEF DESCRIPTION OF THE DRAWINGS

Further advantages and details can be found in the following description of exemplary embodiments in conjunction with the drawings. The drawings show the following basic principles.

DETAILED DESCRIPTION OF INVENTION

The machine tool is a development of the prior art machine tool, which has been explained above as an example in conjunction with FIG. 1. The machine tool thus features the same element as the prior art machine tool.

Figure 3:
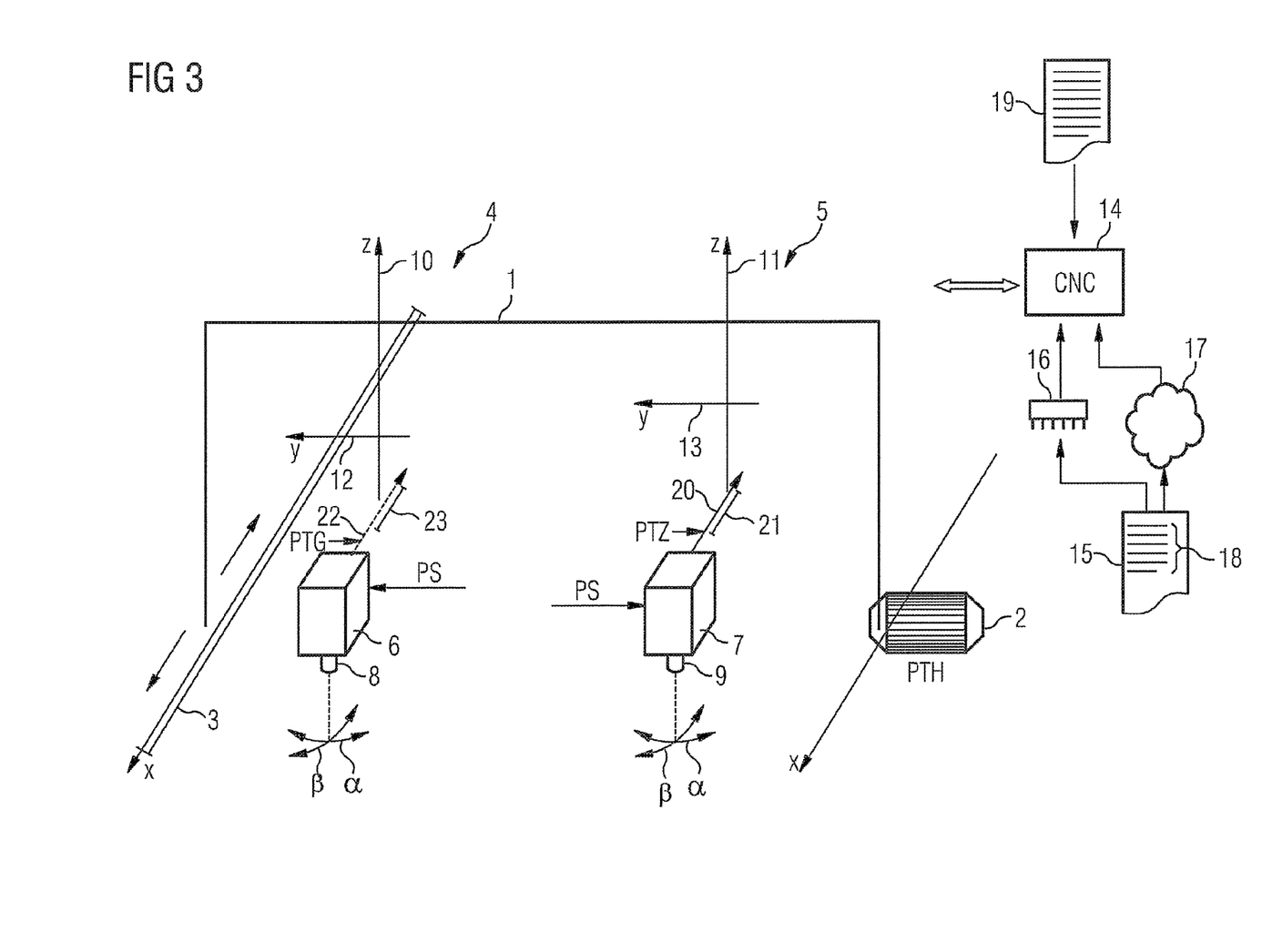

These elements are also provided in FIG. 3 with the same reference symbols as in FIG. 1. In addition the machine tool also features a supplementary accessory positioning device 20 however. The accessory pivot device 6 is connected via the supplementary accessory positioning device 20 to the main support element 1. The supplementary machining head 9 is able to be positioned by means of the supplementary accessory positioning device 20 in the at least one translational linear direction—in accordance with FIG. 3 the x-direction—relative to the main support element 1.

The positionability by means of the supplementary accessory positioning device 20 is only possible within a supplementary accessory region of displacement 21. The supplementary accessory region of displacement 21 is as a rule significantly smaller than the main region of displacement 3. This is however not critical as a rule. By contrast it is of significance that the translational linear direction (or with a number of directions the translational linear directions), in which the supplementary accessory positioning device 20 is able to translationally position the accessory pivot device 6 corresponds to the translational linear direction (or in the case of a number of directions with the translational linear directions) in which the main support element 1 is able to be translationally positioned.

In the typical embodiment in accordance with FIG. 3 the supplementary accessory region of displacement 21 is for example restricted to one direction. The supplementary accessory region of displacement 21 mostly only amounts to a few cm, for example 5 to 20 cm. The main region of displacement 3 by contrast, although only restricted to the translational x-direction, often amounts to several meters, for example 5 to 10 meters. The size ratio of the main region of displacement 3 to the supplementary accessory region of displacement 21 lies as a rule between 30:1 and 300:1.

In accordance with the diagram shown in FIG. 3 the supplementary accessory positioning device 20 is arranged such that it is subsidiary to the further positioning device 11, 13, by means of which the accessory machining head 9 is positioned in the y-direction and the x-direction. This embodiment is actually possible and even preferable, but not mandatory. The supplementary accessory positioning device 20 could be arranged at any point, also for example before or between the further positioning devices 11, 13, if it only fulfills the functionality explained above.

The machine tool is also—like the prior art machine tool—controlled by a corresponding control device 14, which is programmed by means of a corresponding computer program 15, unlike the embodiment depicted in FIG. 1 the computer program 15 is however embodied such that the control device 14 controls the machine tool in accordance with an operating method which will subsequently be explained in greater detail in connection with FIG. 4. The further embodiment of the computer program 15, of the data medium 16 and of control device 14 remains unchanged however. Similar to the embodiment depicted in FIG. 1 the computer program 15 thus comprises machine code 18, the execution of which by the control device 14 causes the control device 14 to control the machine tool in accordance with an operating method as will be explained below in connection with FIG. 4, the computer program 15 is stored on the data medium 16 and if the computer program 15 is stored in the control device 14, with the computer program 15 able to be executed by the control device 14.

Figure 4:
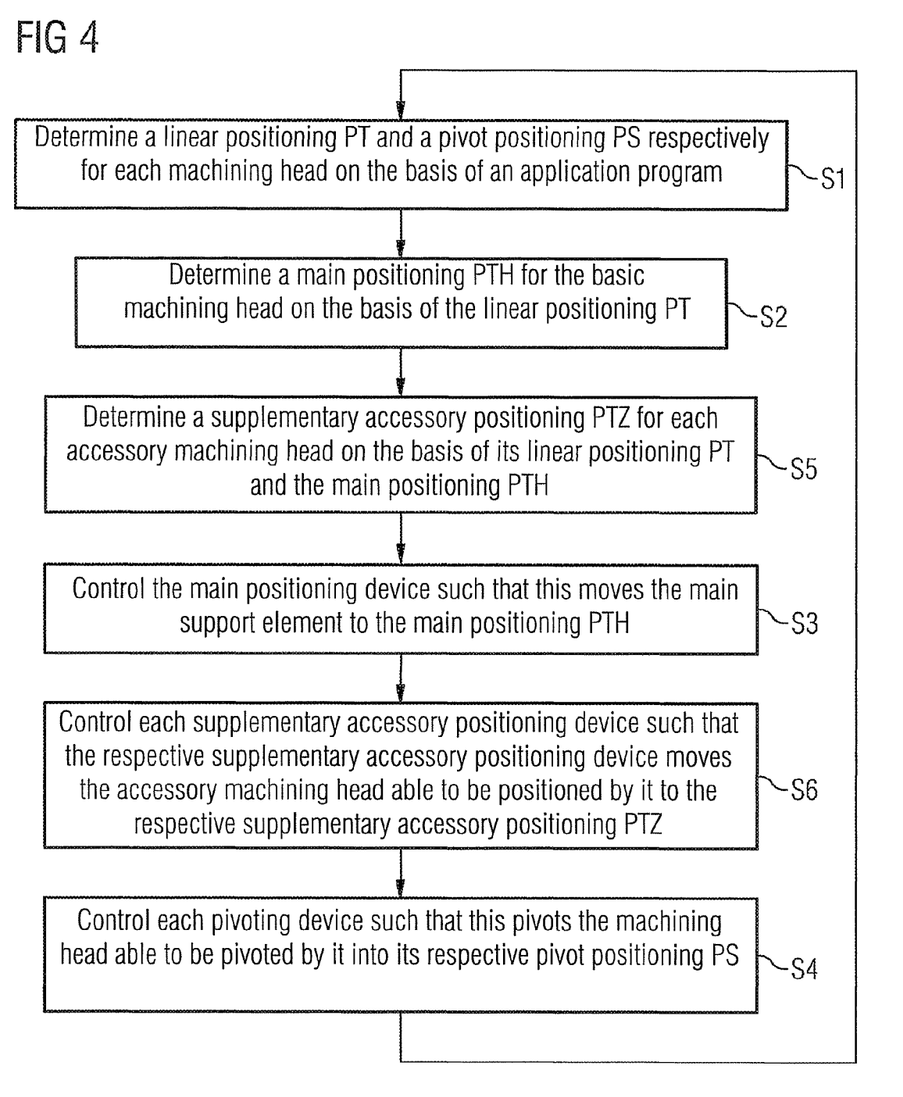

In accordance with FIG. 4 the control device 14—just as in FIG. 2—executes its control program cyclically. Steps S5 and S6 are present however in addition to the steps S1 to S4, which have already been explained in connection with FIG. 2. In step S5 the control device 14 determines a supplementary accessory positioning PTZ for each accessory machining head 9 on the basis of its linear positioning PT and the main positioning PTH respectively. The supplementary accessory positioning PTZ corresponds to the difference between linear positioning PT for the respective accessory machining head 9 and main positioning PTH. In step S6 the control device 14 controls each supplementary accessory positioning device 20 such that the respective supplementary accessory positioning device 20 moves the accessory machining head 9 able to be positioned by it to the respective supplementary accessory positioning PTZ.

It is possible for the control device 14 to determine the linear positioning PT of the machining heads 8, 9 directly. In this case the linear positionings PT of the machining heads 8, 9 should preferably be determined independently of each other. Furthermore in this case the pivot positionings PS of the machining heads 8, 9 can also be determined independently of each other.

The process for determination of the linear positioning PT can example be as explained in more detail below in connection with FIG. 5. In accordance with FIG. 5, step S1 of FIG. 4 can be implemented for example as follows:

In a step S11 the control device selects 14 the basic machining head 8. In a step S12 the control device 14 determines a preliminary linear positioning PT' for the selected machining head 8, 9 on the basis of the application program 19. This determination is undertaken while ignoring the pivot positioning PS for the selected machining head 8, 9.

In a step S13 the control device 14 determines, on the basis of the pivot positioning PS of the selected machining head 8, 9 and geometry data, linear position correction data PT" for the selected machining head 8, 9. The geometry data in this case is specific for the selected machining head 8, 9. In a step S14 the control device 14 determines on the basis of the preliminary linear positioning PT' and the linear position correction data PT" of the selected machining head 8, 9 the (final) linear positioning PT for the selected machining head 8, 9.

In a step S15 the control device 15 determines a logical variable DONE. The logical Variable DONE assumes the value "TRUE" if and only if the control device 14 has already determined for all accessory machining heads 9 their (final) linear positioning PT and their pivot positioning PS. The control device checks the value of the logical variable DONE in a step S16.

Figure 5:
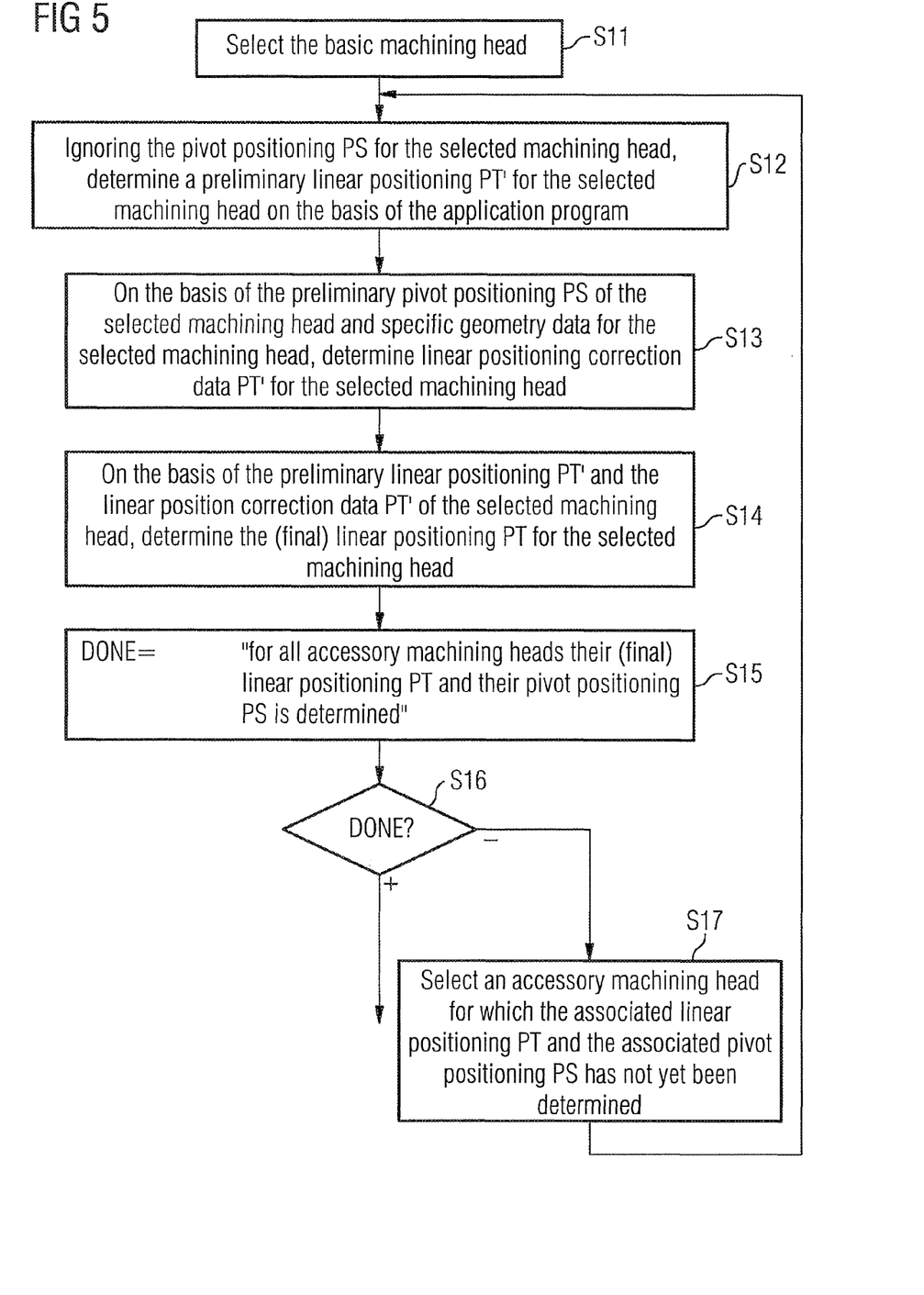

When the logical Variable DONE has the value "TRUE" the method of FIG. 5 is ended. If not, the control device 14 jumps to a step S17. In step S17 the control device 14 selects an accessory machining head 9 for which it has not yet determined the associated linear positioning PT and the associated pivot positioning PS. From step S17 the control device 14 returns to step S12.

With the embodiment in accordance with FIG. 5 the control device 14 determines the preliminary linear positioning PT' and the pivot positioning PS for each machining head 8, 9 independently of the preliminary linear positioning PT' and the pivot positioning PS of the other machining heads 8, 9.

Alternatively it is possible to proceed as described below in connection with FIG. 6.

Figure 6:
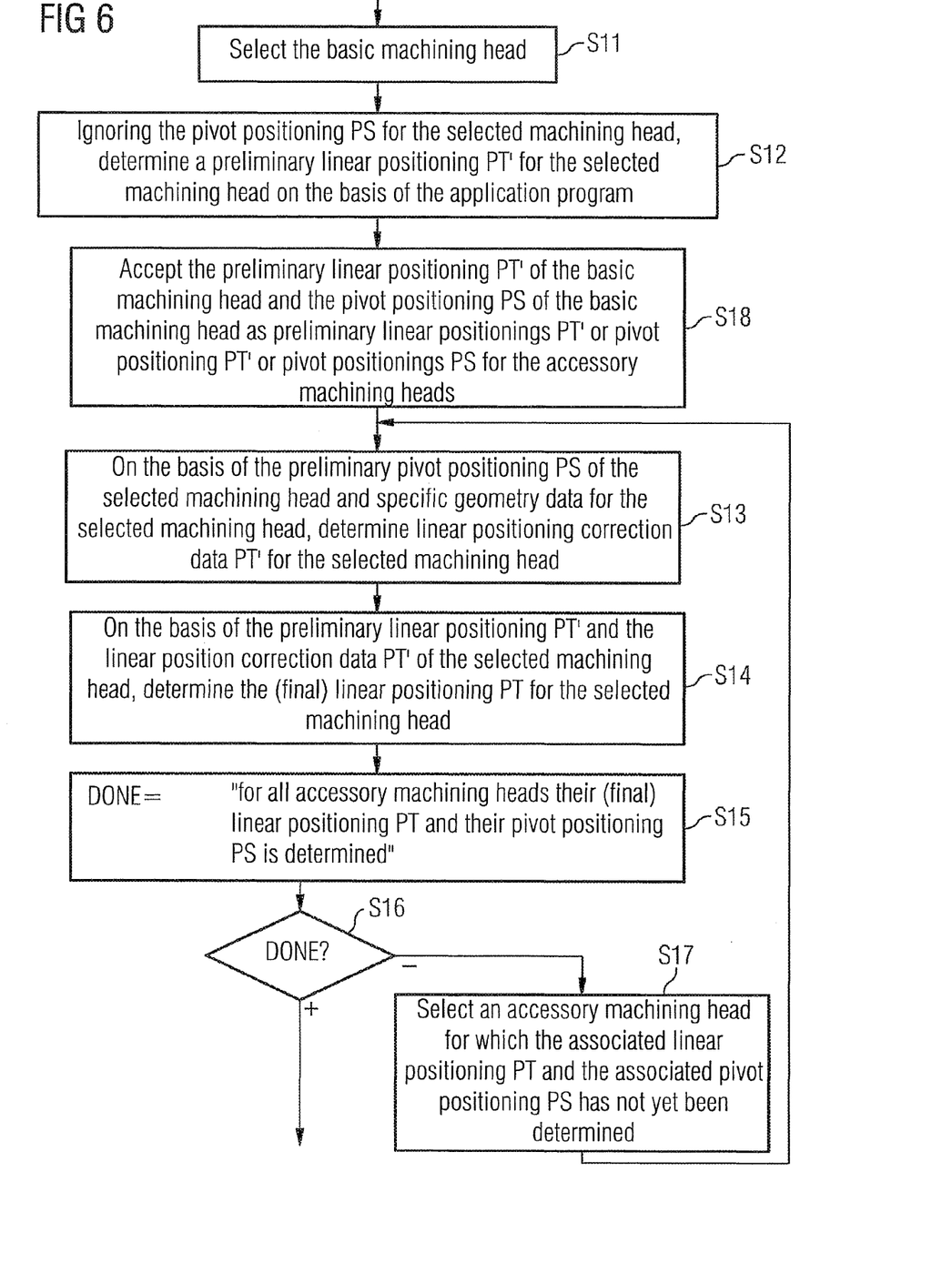

The methodology of FIG. 6 essentially corresponds to the methodology of FIG. 5. There are two differences however. One difference is that, in addition to the steps S11 to S17, a step S18 is present, which is inserted between the steps S12 and S13. In step S18 the control device 14 accepts the preliminary linear positioning PT' of the basic machining head 8 and the pivot positioning PS of the basic machining head 8 as preliminary linear positionings PT' or pivot positionings PS for the accessory machining heads 9. The other difference is that the program does not return from step S17 to step S12 but to step S13.

In the prior art the step S2 of FIG. 4 is embodied so that the control device 14 accepts the linear positioning PT for the basic machining head 8 as the main positioning PTH. This embodiment can—see FIG. 7—be retained by the present invention. In the event of the optional embodiment of the machine tool described in greater detail below not being produced, this embodiment is even an absolute requirement.

In accordance with FIG. 3 it is however optionally possible—in addition to the connection of the accessory pivot devices 7 to the main support element 1 via a respective supplementary accessory positioning device 20—for the basic pivot device 6 to also be connected with the main support element 1 via a basic accessory positioning device 22. In this case the basic machining head 8 is also positioned by means of the basic accessory positioning device 22 in the at least one translational linear direction relative to the main support element 1. The positionability relative to the main support element 1 corresponds in this case as regards the translational degrees of freedom as such to those of the main support element 1. The positionability is however only possible within a basic accessory region of displacement 23, with the basic accessory region of displacement 23—like the supplementary accessory regions of displacement 21—being significantly smaller than the main region of displacement 3.

The last described embodiment of the machine tool, i.e. the additional presence of the basic accessory positioning device 22, is only optional. For this reason the basic accessory positioning device 22 is only depicted by a dashed outline in FIG. 3.

Figure 7:
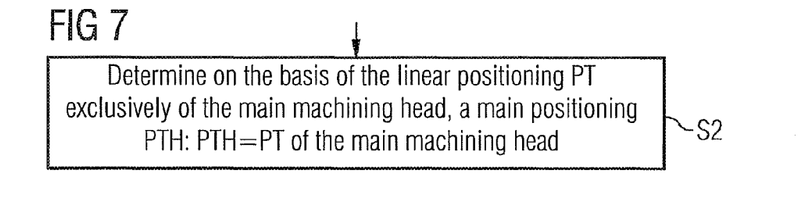

If the basic accessory positioning device 22 is present the embodiment of step S2 according to FIG. 7 can be retained. In this case this embodiment is no longer absolutely necessary however. As an alternative to the methodology in accordance with FIG. 7, a methodology is also possible in this case which will be explained in greater detail below in connection with FIG. 8.

Figure 8:
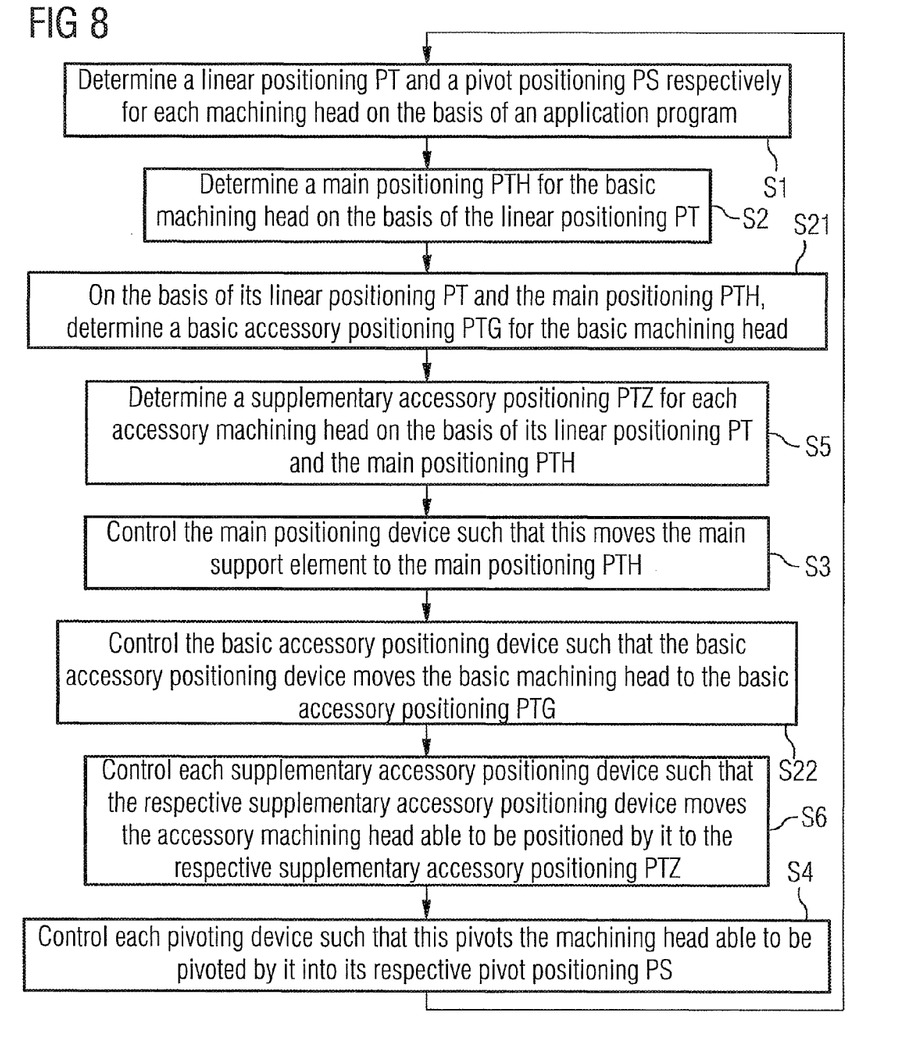

FIG. 8 contains the steps S1 to S6 of FIG. 4 as well as additional steps S21 and S22. Steps S1 and S3 to S6 can be retained unchanged. Step S2 is slightly modified. Thus only the modified step S2 as well as the steps S21 and S22 will be explained in greater detail below.

In the modified step S2 the control device 14 determines the main positioning PTH on the basis of the linear positionings PT of all machining heads 8, 9. For example can the main positioning PTH can be determined as the average value of the linear positionings PT of all machining heads 8, 9. As an alternative for example—in each of the possible displacement directions of the main support element 1—the minimum and the maximum linear positioning PT of the machining heads 8, 9 can be determined and the main positioning PTH determined for each translational direction of the main support element 1 as the average of minimum value and maximum value.

In step S21 the control device 14 determines for the basic machining head 8 on the basis of its linear positioning PT and the main positioning PTH a basic accessory positioning PTG. The basic accessory positioning PTG is determined in a similar way to the determination of the supplementary accessory positioning PTZ. In step S22 the control device 14 controls the basic accessory positioning device 22 such that the basic accessory positioning device 22 moves the basic machining head 8 to the basic accessory positioning PTG determined in step S21.

The supplementary positioning devices 20, 22 should preferably have a dynamic which is at least as large as the dynamic of the main positioning device 2. If only the supplementary accessory positioning devices 20 are present, it is sufficient for the dynamic of the supplementary positioning devices 20 to be just as large as the dynamic of the main positioning device 2.

If the basic accessory positioning device 22 is also present, it is likewise possible for the dynamic of the accessory positioning devices 20, 22 to be just as large as the dynamic of the main positioning device 2. If the basic accessory positioning device 22 is also present, it is alternatively possible however for the accessory positioning devices 20, 22 to have a dynamic which is greater than the dynamic of the main positioning device 2. This is indicated in FIG. 3 by the fact that a displacement movement of the main support element 1 in FIG. 3 is shown by a single arrow, a displacement movement of the pivot devices 6, 7 relative to main support element 1 on the other hand by double arrows. Such a larger dynamic can especially be useful if the further positioning device 10 to 13 likewise has a dynamic which is greater than the dynamic of the main positioning device 2.

The machine tool, the method of operation as well as the corresponding further objects (computer program 15, data medium 16 and control device 14) have a plurality of advantages compared to the prior art. In particular it is no longer absolutely necessary for the basic machining head 8 and the accessory machining heads 9 to implement corresponding machining to each other. In the case of different machining it is merely necessary to ensure that the relative displacements required for this of the machining heads 8, 9 relative to each other are able to be realized by means of the accessory positioning devices 20, 22. Furthermore mechanical tolerances can be eliminated and the accuracy of the machining processes increased with productivity remaining unchanged. Tools can be better utilized.

The present invention is not restricted to a realization with two machining heads 8, 9, i.e. a basic machining head 8 and a single supplementary machining head 9. Instead the present invention can easily also be implemented with a number of supplementary machining heads 9. In this case each supplementary machining head 9 respectively is assigned a separate supplementary accessory positioning device 20 which is controlled accordingly by the control device 14.

The above description serves exclusively to explain the present invention. The scope of protection of the present invention on the other hand is intended to be exclusively defined by the enclosed claims.

The invention claimed is:

1. A machine tool, comprising:
a portal positioning device;
a portal being positioned by the main portal positioning device in a translational linear direction within a main region of displacement;
a basic machining device being arranged on the portal;
a basic pivoting device having a basic machining head, the basic pivoting device being part of the basic machining device and pivoting the basic machining head in a rotational basic pivoting direction;
an accessory machining device being arranged on the portal;
an accessory pivoting device having an accessory machining head, the accessory pivoting device being part of the accessory machining device and pivoting the accessory machining head in a respective rotational accessory pivoting direction;
a supplementary accessory positioning device, the accessory pivoting device being connected to the portal via the supplementary accessory positioning device, wherein the accessory machining head is positioned in the translational linear direction of travel that is parallel to the portal linear direction of travel within a supplementary accessory region of displacement by the supplementary accessory positioning device.

2. The machine tool as claimed in claim 1, wherein the supplementary accessory region of displacement is significantly smaller than the main region of displacement.

3. The machine tool as claimed in claim 1, further comprising:
a basic accessory positioning device, wherein the basic pivoting device is connected to the portal via the basic accessory positioning device, the basic machining head being positioned by the basic accessory positioning device in the at least one translational linear direction relative to the portal within a basic accessory region of displacement.

4. The machine tool as claimed in claim 3, wherein the basic accessory region of displacement is significantly smaller than the main region of displacement.

5. The machine tool as claimed in claim 3, wherein the basic accessory positioning device and the supplementary accessory positioning device have a dynamic which is larger than the dynamic of the portal.

6. An operating method of a machine tool with a control device, comprising:
determining a translational linear positioning and a rotational pivot positioning for a basic machining head and an accessory machining head based upon an application program;
determining a translational main positioning of the portal for the basic machining head based upon the translational linear positioning;
determining a translational supplementary accessory positioning for the accessory machining head based upon the translational linear positioning and the translational main positioning of the portal;
controlling a portal main positioning device such that a portal is being moved to the translational main positioning along a portal linear direction of travel;
controlling a supplementary accessory positioning device such that the accessory machining head is being moved to the translational supplementary accessory positioning along a supplementary accessory positioning device linear direction of travel that is parallel to the portal linear direction of travel; and controlling a basic pivoting device and an accessory pivoting device such that the basic machining head and the accessory machining head are being pivoted into the respective rotational pivot positioning.

7. The method of operation as claimed in claim 6, wherein for the basic machining head and the accessory machining head the control device determines the respective translational linear positioning, comprising:
   determining a respective preliminary translational linear positioning based upon the application program while ignoring the respective rotational pivot positioning;
   determining respective translational linear position correction data based upon the respective rotational pivot positioning and geometry data specific for the respective machining head and
   determining the respective translational linear positioning based upon the respective preliminary translational linear positioning and the respective translational linear position correction data.

8. The method of operation as claimed in claim 7, wherein the control device determines for the accessory machining head the preliminary translational linear positioning and the rotational pivot positioning, comprising:
   determining the preliminary translational linear positioning and the rotational pivot positioning for the basic machining head; and
   accepting the preliminary translational linear positioning and rotational pivot positioning for the accessory machining head.

9. The method of operation as claimed in claim 7, wherein the control device determines the preliminary translational linear positioning and the rotational pivot positioning for each machining head independently of the preliminary translational linear positioning and the rotational pivot positioning of other machining heads.

10. The operating method as claimed in claim 6, wherein the control device determines the translational linear positioning and the rotational pivot positioning for each machining head independently of the translational linear positioning and the rotational pivot positioning of other machining heads.

11. The operating method as claimed in claim 7, wherein the control device determines the translational linear positioning and the rotational pivot positioning for each machining head independently of the translational linear positioning and the rotational pivot positioning of other machining heads.

12. The operating method as claimed in claim 6, further comprising:
   accepting by the control device the translational linear positioning for the basic machining head as translational main positioning of the portal.

13. The operating method as claimed in claim 6, further comprising:
   determining the translational main positioning of the portal based upon the translational linear positioning of all machining heads;
   determining for the basic machining head a translational basic accessory positioning based upon the translational linear positioning and the translational main positioning of the portal along a basic accessory positioning device linear direction of travel that is parallel to the linear portal direction of travel; and
   controlling the basic accessory positioning device such that the basic machining head is being moved to the translational basic accessory positioning.

14. A non-transitory computer readable medium storing a machine code that when executed by a control device for a machine tool performs an operating method, comprising:
   determining a translational linear positioning and a rotational pivot positioning for a basic machining head and an accessory machining head based upon an application program;
   determining a translational main positioning of the portal for the basic machining head based upon the translational linear positioning;
   determining a translational supplementary accessory positioning for the accessory machining head based upon the translational linear positioning and the translational main positioning of the portal;
   controlling a portal positioning device such that a portal is being moved to the translational main positioning of the portal along a portal linear direction of travel;
   controlling a supplementary accessory positioning device such that the accessory machining head is being moved to the translational supplementary accessory positioning along a supplemental accessory positioning device linear direction of travel that is parallel to the portal linear direction of travel; and
   controlling a basic pivoting device and an accessory pivoting device such that the basic machining head and the accessory machining head are being pivoted into the respective rotational pivot positioning.

15. The non-transitory computer readable medium as claimed in claim 14, wherein for the basic machining head and the accessory machining head the control device determines the respective translational linear positioning, the machine code further comprising:
   determining a respective preliminary translational linear positioning based upon the application program while ignoring the respective rotational pivot positioning;
   determining respective translational linear position correction data based upon the respective rotational pivot positioning and geometry data specific for the respective machining head and determining the respective translational linear positioning based upon the respective preliminary translational linear positioning and the respective translational linear position correction data.

16. The non-transitory computer readable medium as claimed in claim 15, wherein the control device determines for the accessory machining head the preliminary translational linear positioning and the rotational pivot positioning, the machine code further comprising:
   determining the preliminary translational linear positioning and the rotational pivot positioning for the basic machining head; and
   accepting the preliminary translational linear positioning and rotational pivot positioning for the accessory machining head.

17. The non-transitory computer readable medium as claimed in claim 15, wherein the preliminary translational linear positioning and the rotational pivot positioning for each machining head is determined independently of the preliminary translational linear positioning and the rotational pivot positioning of other machining heads.

18. The non-transitory computer readable medium as claimed in claim 14, wherein the translational linear positioning and the rotational pivot positioning for each machining head is determined independently of the translational linear positioning and the rotational pivot positioning of other machining heads.

19. The non-transitory computer readable medium as claimed in claim 14, the machine code further comprising:
   accepting by the control device the translational linear positioning for the basic machining head as translational main positioning of the portal.

20. The non-transitory computer readable medium as claimed in claim 14, the machine code further comprising:
   determining the translational main positioning of the portal based upon the translational linear positioning of all machining heads;
   determining for the basic machining head a translational basic accessory positioning based upon the translational linear positioning and the translational main positioning of the portal along a basic accessory positioning device linear direction of travel that is parallel to the portal linear direction of travel; and
   controlling the basic accessory positioning device such that the basic machining head is being moved to the translational basic accessory positioning.

* * * * *